United States Patent
Lee et al.

(10) Patent No.: US 10,525,422 B2
(45) Date of Patent: Jan. 7, 2020

(54) METHOD OF PREPARING THIN FILM COMPOSITE FORWARD OSMOSIS MEMBRANES USING POLYETHYLENE POROUS SUPPORTS

(71) Applicant: Korea University Research and Business Foundation, Seoul (KR)

(72) Inventors: Jung-hyun Lee, Seoul (KR); Sang Hee Park, Seoul (KR); Soon Jin Kwon, Daejeon (KR)

(73) Assignee: Korea University Research and Business Development, Seoul (KR)

( * ) Notice: Subject to any disclaimer, the term of this patent is extended or adjusted under 35 U.S.C. 154(b) by 78 days.

(21) Appl. No.: 15/642,555

(22) Filed: Jul. 6, 2017

(65) Prior Publication Data
US 2018/0008939 A1  Jan. 11, 2018

(30) Foreign Application Priority Data

Jul. 7, 2016 (KR) .................. 10-2016-0086156
Feb. 10, 2017 (KR) .................. 10-2017-0018447

(51) Int. Cl.
| | | |
|---|---|---|
| *B01D 71/44* | (2006.01) | |
| *B01D 61/00* | (2006.01) | |
| *B01D 67/00* | (2006.01) | |
| *B01D 69/02* | (2006.01) | |
| *B01D 69/10* | (2006.01) | |
| *B01D 69/12* | (2006.01) | |
| *B01D 71/26* | (2006.01) | |
| *B01D 71/56* | (2006.01) | |

(52) U.S. Cl.
CPC .......... *B01D 71/44* (2013.01); *B01D 61/002* (2013.01); *B01D 67/009* (2013.01); *B01D 69/02* (2013.01); *B01D 69/105* (2013.01); *B01D 69/125* (2013.01); *B01D 71/26* (2013.01); *B01D 71/56* (2013.01); *B01D 2323/02* (2013.01); *B01D 2325/20* (2013.01); *B01D 2325/24* (2013.01)

(58) Field of Classification Search
None
See application file for complete search history.

(56) References Cited

U.S. PATENT DOCUMENTS

| | | | |
|---|---|---|---|
| 2008/0197070 A1 | 8/2008 | Sirkar et al. | |
| 2015/0060364 A1* | 3/2015 | McCutcheon | B01D 69/12 210/654 |
| 2015/0136688 A1* | 5/2015 | Moon | B01D 69/125 210/490 |

FOREIGN PATENT DOCUMENTS

| | | |
|---|---|---|
| KR | 101464719 B1 | 11/2014 |
| WO | 2016024573 A1 | 2/2016 |

* cited by examiner

*Primary Examiner* — Bradley R Spies
(74) *Attorney, Agent, or Firm* — Fox Rothschild LLP

(57) ABSTRACT

The present invention relates to a thin film composite forward osmosis membrane with a polyethylene porous support, and a thin film composite forward osmosis membrane which is low cost, has excellent durability and chemical resistance, and outstanding performance (water flux and specific salt flux) may be provided in the present invention.

23 Claims, 3 Drawing Sheets

[FIG. 1]
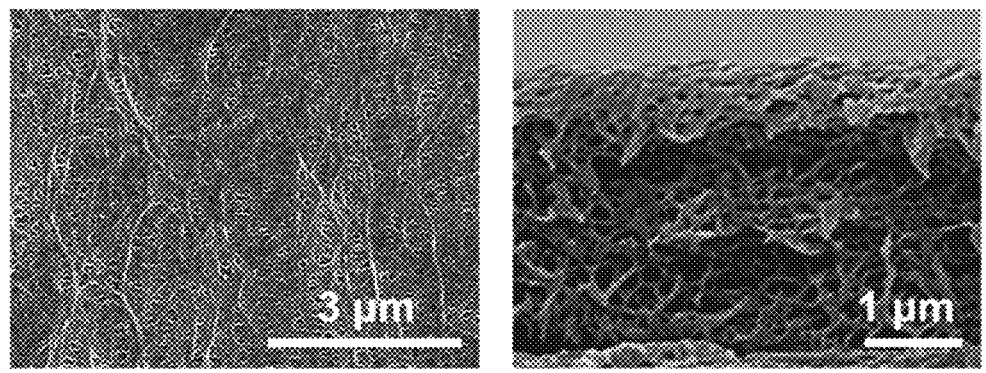
[FIG. 2]
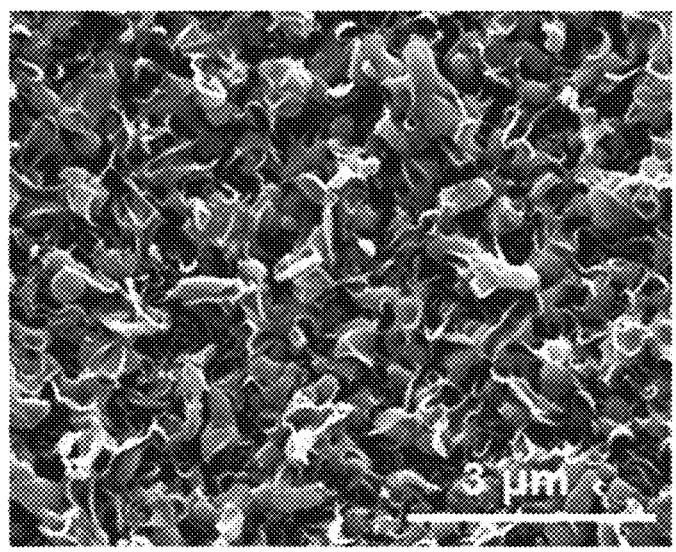

[FIG. 3]
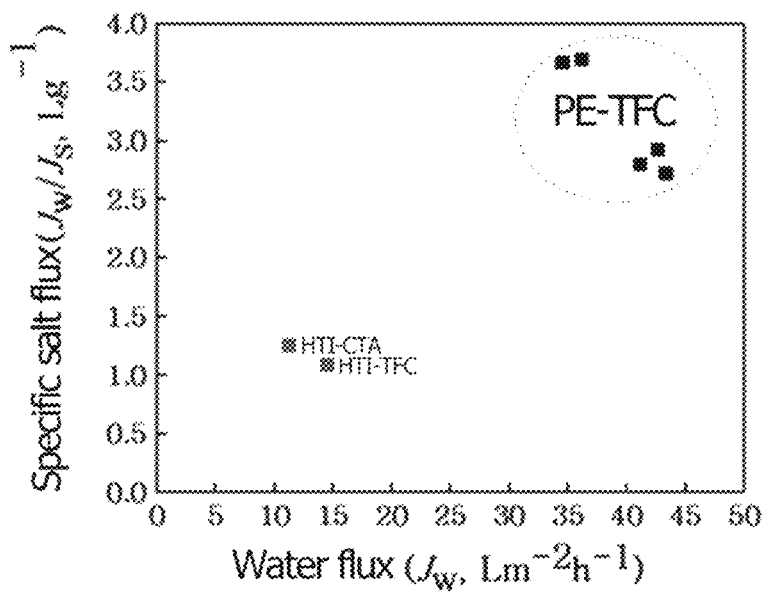
[FIG. 4]
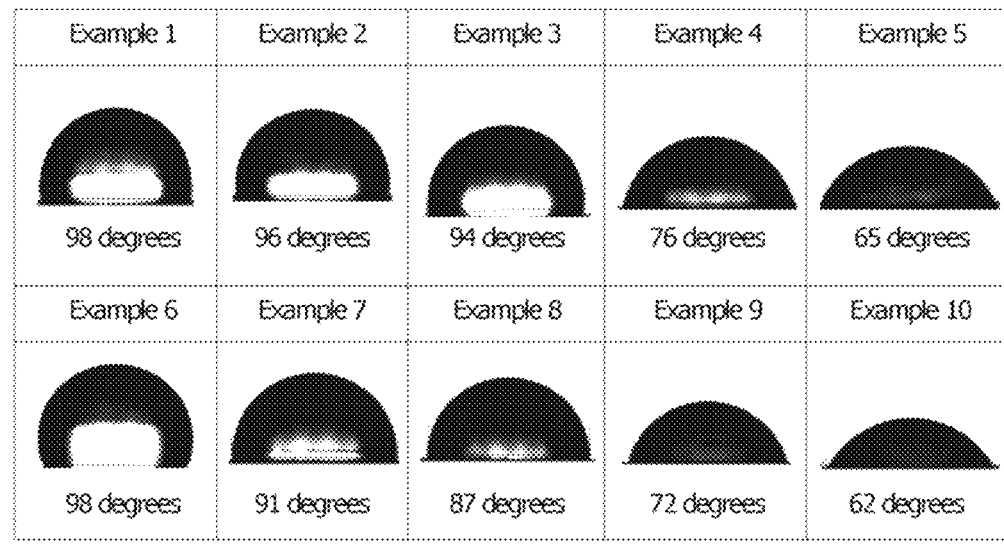

[FIG. 5]
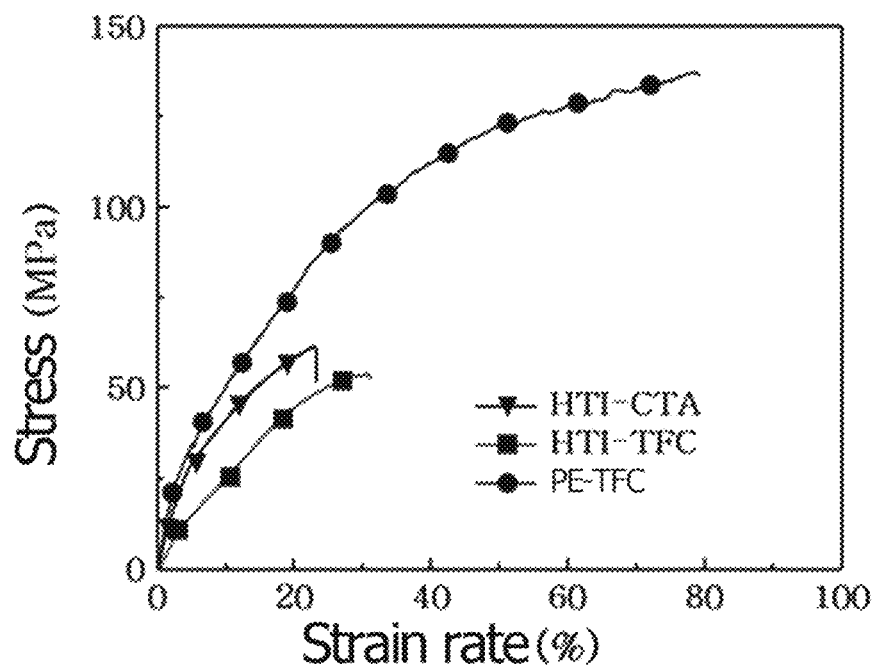

METHOD OF PREPARING THIN FILM COMPOSITE FORWARD OSMOSIS MEMBRANES USING POLYETHYLENE POROUS SUPPORTS

BACKGROUND

1. Field of the Invention

The present invention relates to National R&D Management Agency: "Korea Environmental Industry Technology Institute": project No.: "2016002100007", research project name: "Eco Smart Waterworks System Development Project Phase II": and research name: "[ClecoCMS] NF/LPRO Membrane-based Advanced Water Treatment Membrane Pollution Controller Development Project, and National R&D Management Agency: "Korea Research Foundation": project No.: "2016R1D1A1B03933552", research project name: "General researcher support project": and research name: "Development of osmosis membrane through control of mass transfer structure", as a part of the National Research and Development Project.

The present invention relates to a method of preparing a thin film composite membrane using a polyethylene (PE) porous support. The thin film composite membrane is usable in a forward osmosis process. Furthermore, it is usable in a pressure-retarded osmosis (PRO) or pressure assisted osmosis (PAO) process.

2. Discussion of Related Art

Unlike a reverse osmosis separation technique that applies pressure through the semipermeable membrane, a forward osmosis separation technique is a water treatment process technology that separates substances using osmotic pressure generated by a concentration difference without external driving pressure. The above technology can be applied to various process fields including a water treatment field such as low energy seawater desalination and desalting, wastewater and sewage treatment as well as purification of food and bio-products, and power generation by salinity gradients, etc.

A cellulose triacetate (CTA) membrane from HTI is the most widely known commercially available membrane used in this forward osmosis process. However, since the membrane has a single membrane form with a high density, water flux is low, and chemical resistance to pH change is low due to the characteristics of the material.

Recently, a forward osmosis membrane has been developed in the form of a thin film composite (TFC) composed of a porous support and a thin film selective layer in order to improve water permeability. Generally, the performance of the reverse osmosis membrane largely depends on the characteristics of the selective layer rather than the characteristics of the support. On the other hand, the performance of the forward osmosis membrane is greatly influenced not only by the selective layer but also by the physicochemical structure of the support. That is, it is preferable to minimize internal concentration polarization (ICP) in the membrane by using a thin support having high hydrophilicity, porosity and pore connectivity in order for the forward osmosis membrane to have high water permeability. Further, it is preferable to use a support having a small and uniform pore structure to produce a selective layer with high selectivity.

Furthermore, an ideal membrane should have excellent mechanical and chemical durability as well as high permeation performance and selectivity to be applicable to various application environments.

So far, various polymers such as polysulfone (PSF), polyethersulfone (PES), polyacrylate, polyacrylonitrile (PAN) and polyketone have been used in the preparation of the support. The above polymers are relatively expensive at a price of 3,000 to 25,000 US $/ton. Moreover, since mechanical durability should be reinforced by using a nonwoven fabric or a mesh in order to produce a thin film, material transfer resistance (internal concentration polarization, ICP) is increased and water flux is lowered.

Further, polysulfone cannot be used in the field of treating pollutants containing organic solvents (DMF, NMP, toluene, THF, etc.) such as factory wastewater or chemical synthesis waste due to its low durability against the organic solvent.

SUMMARY OF THE INVENTION

An object of the present invention is to provide a thin film composite forward osmosis membrane which is low cost, has excellent mechanical durability and chemical resistance, and outstanding separation performance (water flux and specific salt flux), and a method of preparing the same.

According to an aspect of the present invention, there is provided a thin film composite forward osmosis membrane including a polyethylene support; and a selective layer formed on the polyethylene support, in which the thin film composite membrane has a structural parameter (S) of 1000 μm or less.

Furthermore, according to another aspect of the present invention, there is provided a method of preparing the thin film composite forward osmosis membrane, which includes forming a selective layer on a polyethylene support.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 includes images showing a surface and sectional structure of a polyethylene support used in an embodiment of the present invention;

FIG. 2 is an image showing a surface structure of a thin film composite membrane prepared in Example 7 of the present invention;

FIG. 3 is a graph showing a result of comparing the performance of thin film composite membranes prepared in Examples 1, 2, 3, 6 and 8 of the present invention and membranes prepared in comparative examples;

FIG. 4 includes images showing a water contact angle of a polyethylene support that is surface-treated according to Examples 1 to 10; and FIG. 5 is a graph showing a result of comparing mechanical strength of thin film composite membrane prepared in Example 7 of the present invention and a membrane prepared in comparative Examples.

DETAILED DESCRIPTION OF EXEMPLARY EMBODIMENTS

Hereinafter, a thin film composite membrane of the present invention will be described in detail.

The thin film composite membrane according to the present invention includes a polyethylene (PE) support; and a selective layer formed on the polyethylene support.

In the present invention, the polyethylene support serves to support the selective layer and reinforce mechanical strength of the thin film composite membrane.

Such a polyethylene support may be formed of a polyethylene resin, or a resin including polyethylene and polypropylene, polymethylpentene, polybutene-1 or a mixture thereof. When polymethylpentene, polybutene-1 or a mixture thereof is further included in addition to the polypropylene to form a support, mechanical properties or the like can be improved.

The polyethylene uses raw materials that are cheaper than other materials, has high porosity and pore connectivity due to its interconnected pore structure, and exhibits excellent mechanical strength even with a thin thickness, and thus can be easily used as a support of a thin film composite membrane. Moreover, due to having excellent thermal and chemical stability, the polyethylene enables maximization of durability of the membrane and application in various environmental conditions. Furthermore, since polyethylene has uniform pores, a selective layer with stability and high selectivity can be formed on a support.

The polyethylene support may have a thickness of 1 to 30 μm, 1 to 20 μm, 1 to 18 μm or 5 to 10 μm. In this thickness range, excellent performance as a forward osmosis, pressure-retarded osmosis (PRO) or pressure assisted osmosis (PAO) membrane can be realized. Although the polyethylene support with a thickness of more than 20 μm has physical properties and performance usable as a membrane, a decrease in water flux and an increase in manufacturing costs may be caused, and thus the thickness thereof is preferably adjusted to 1 to 20 μm.

The polyethylene support may have a pore size of 1 to 10000 nm, 10 to 1000 nm, 20 to 500 nm or 200 to 400 nm. Furthermore, the porosity of the polyethylene support may be 20 to 90%, 30 to 90%, 40 to 90% or 50 to 90%. The polyethylene support with the aforementioned pore size and porosity can have excellent water flux and specific salt flux.

In the present invention, the polyethylene support may have a water contact angle of 120 degrees or less, or 100 degrees or less, and a surface free energy of 30 $mJm^{-2}$ or more, or 35 $mJm^{-2}$ or more. In this range, performance as a membrane such as a forward osmosis membrane or the like is excellent.

The polyethylene support according to the present invention may be a hydrophilized polyethylene support. Since surface energy is increased due to the hydrophilization, preparation of a selective layer by interfacial polymerization becomes easy and adhesion between the support and selective layer can be increased.

Such hydrophilization may be performed on one or both surfaces of the polyethylene support. When one surface is hydrophilized, a surface on which a selective layer will be formed may be hydrophilized.

In the present invention, the hydrophilized polyethylene support may have a water contact angle of 110 degrees or less, 105 degrees or less, 100 degrees or less, or 95 degrees or less, and a surface free energy of 40 $mJm^{-2}$ or more, 43 $mJm^{-2}$ or more. In this range, performance as a membrane such as a forward osmosis membrane or the like is excellent.

In the present invention, the selective layer is formed on the polyethylene support.

The selective layer may include crosslinked or uncrosslinked polyamide, polypiperazine-amide, polyester, polyurethane, polyvinyl alcohol, polyimide or polyetherimide, or a fully aromatic compound, a partially aromatic compound or a fully aliphatic compound.

Such a selective layer may have a thickness of 1 to 10000 nm.

Furthermore, in the present invention, the thin film composite membrane may have a water permeability coefficient (A) of 1.0 $Lm^{-2}h^{-1}bar^{-1}$ or more, 1.3 $Lm^{-2}h^{-1}bar^{-1}$ or more, or 1.5 $Lm^{-2}h^{-1}bar^{-1}$ or more, a salt permeability coefficient (B) of 10.0 $Lm^{-2}h^{-1}$ or less, 5.0 $Lm^{-2}h^{-1}$ or less, 3.0 $Lm^{-2}h^{-1}$ or less, 1.0 $Lm^{-2}h^{-1}$ or less, 0.7 $Lm^{-2}h^{-1}$ or less, or 0.6 $Lm^{-2}h^{-1}$ or less, and an intrinsic selectivity (B/A) of 300 kPa or less, 100 kPa or less, 50 kPa or less, 30 kPa or less, or 20 kPa or less when 200 ppm of a NaCl solution is used under conditions including a pressure of 5 bar, a flow rate of 1.0 $Lmin^{-1}$ and a temperature of 25±0.5° C. Here, the water permeability coefficient (A) represents increase rate values of water permeability according to a pressure, and may be calculated by dividing the amount of water permeated per unit time per unit area by the pressure condition. The salt permeability coefficient (B) refers to increase rate values of salt permeability according to the concentration gradient of salts, and may be calculated by the amount of salts permeated reversely per unit time per unit area. Furthermore, the intrinsic selectivity (B/A) represents a ratio of a salt permeability coefficient to a water permeability coefficient, and is also an index indicating selectivity. The lower the value of the intrinsic selectivity (B/A) is, the better the water permeability selectivity is.

Furthermore, in the present invention, the thin film composite membrane may have a water flux ($J_w$) of 20 $Lm^{-2}h^{-1}$ or more, 25 $Lm^{-2}h^{-1}$ or more, 30 $Lm^{-2}h^{-1}$ or more, 34 $Lm^{-2}h^{-1}$ or more, or 40 $Lm^{-2}h^{-1}$ or more, a reverse salt flux ($J_s$) of 100 $gm^2h^{-1}$ or less, 80 $gm^2h^{-1}$ or less, 70 $gm^2h^{-1}$ or less, 60 $gm^2h^{-1}$ or less, 50 $gm^2h^{-1}$ or less, 30 $gm^2h^{-1}$ or less, 23 $gm^2h^{-1}$ or less, or 18 $gm^2h^{-1}$ or less, and a specific salt flux ($J_w/J_s$) of 0.2 $Lg^{-1}$ or more, 0.5 $Lg^{-1}$ or more, 1 $Lg^{-1}$ or more, 2 $Lg^{-1}$ or more, 3 $Lg^{-1}$ or more or 4 $Lg^{-1}$ or more when a 1 M NaCl solution is used under a forward osmosis condition at a flow rate of 0.6 $Lmin^{-1}$ and a temperature of 25±0.5° C. When the water flux, reverse salt flux and specific salt flux are in the aforementioned range, excellent separation properties may be obtained. Here, the higher the value of the specific salt flux ($J_w/J_s$) is, the better the selectivity is.

Furthermore, in the present invention, the thin film composite forward osmosis membrane may have a structural parameter (S) of 1000 μm or less, 200 μm or less, 50 to 200 μm, 100 to 180 μm, or 130 to 170 μm. In this range, performance as a membrane such as a forward osmosis membrane or the like is excellent. Here, the structural parameter is a numerical value indicating the diffusion resistance of salts in the support, and may be calculated by the following Equation 1:

$$S = \frac{D}{J_w} \ln\left(\frac{B + A\pi_{D,b}}{B + J_w + A\pi_{F,m}}\right) \qquad \text{[Equation 1]}$$

where $J_w$ is water flux, A is a water permeability coefficient, B is a salt permeability coefficient, D is a sodium chloride (NaCl) diffusion coefficient of 1.48×10$^{-9}$ $m^2s^{-1}$, $\pi_{D,b}$ is an osmotic pressure of a draw solution, and $\pi_{F,m}$ is an osmotic pressure of feed water contacting a surface of a membrane.

The thin film composite membrane according to the present invention may be used for forward osmosis. In the present invention, forward osmosis may be used to represent not only forward osmosis in the general sense (general forward osmosis) but also pressure-retarded osmosis (PRO) or pressure assisted osmosis (PAO). The thin film composite membrane may have suitable mechanical strength so as to function as a forward osmosis membrane.

Furthermore, the present invention relates to a method of preparing the thin film composite forward osmosis membrane.

The thin film composite membrane may be prepared by forming a selective layer on a polyethylene support.

First, the polyethylene support may be formed of a polyethylene resin, or a resin including polyethylene and polypropylene, polymethylpentene, polybutene-1 or a mixture thereof. Such a polyethylene support may be commercially available or may be prepared in a laboratory or the like.

The polyethylene support according to the present invention may be prepared by a wet process.

In general, a polyolefin-based membrane such as polyethylene is prepared by a dry process based on a stretching process and a wet process based on an extrusion process.

When the polyethylene support is prepared by the dry process, the support has a shape elongated perpendicularly to a stretching direction, and thus has a nonuniform pore size and low porosity and pore connectivity, and it is difficult to adjust the thickness of the support. Therefore, problems of a selective layer not easily forming during the preparation of the membrane and concentration polarization becoming worse are caused.

Accordingly, in the present invention, a polyethylene support having a uniform thickness, a uniform pore size, and excellent porosity and pore connectivity may be prepared by a wet process. Due to a uniform pore size, a selective layer with high performance may be prepared, and excellent porosity and pore connectivity minimize concentration polarization to enable the preparation of the forward osmosis membrane with high water flux and high selectivity.

The polyethylene support according to the present invention may be prepared by melt-extrusion of a polyethylene resin and a diluent, followed by stretching. Furthermore, in the present invention, the polyethylene support may be prepared by further using polypropylene, polymethylpentene, polybutene-1 or a mixed resin thereof in addition to the polyethylene resin and the diluent in the melt-extrusion and stretching.

Through this method, pores are formed by phase separation or cracks between the interface of crystals, and strength is secured by the stretching process. Consequently, the selective layer is easily formed on the support and the excellent effect as a forward osmosis membrane can be exhibited even in a thin thickness.

The polyethylene resin may have a weight average molecular weight of 100,000 to 1,000,000 gmol$^{-1}$. In this range, the mechanical strength and durability of the support to be prepared can be improved.

In an embodiment, the diluent may be an organic liquid that is thermally stable at an extrusion processing temperature, such as aliphatic or cyclic hydrocarbons such as nonane, decane, decalin, paraffin oil or the like, or phthalic acid esters such as dibutyl phthalate, dioctyl phthalate, etc.

As for the content of the polyethylene resin and the diluent, the polyethylene resin may be included at 20 to 50 wt % and the diluent may be included at 50 to 80 wt % based on the total amount of 100 wt %. In this range, the kneadability between the polyethylene resin and the diluent is excellent, the polyethylene resin is not thermodynamically kneaded in the diluent, and the support with excellent stretchability may be prepared.

Furthermore, an inorganic material may be further included the present invention. Here, examples of the inorganic material include silicon dioxide ($SiO_2$), aluminum oxide ($Al_2O_3$), calcium carbonate ($CaCO_3$), titanium dioxide ($TiO_2$), silicon sulfide ($SiS_2$), magnesium oxide (MgO), zinc oxide (ZnO), barium titanate ($BaTiO_3$) or mixtures thereof. The inorganic material may have an average particle size of 0.01 to 5 μm. In this range, the strength of the support is excellent, and the pore size after stretching is suitable for application in the membrane.

Furthermore, as necessary, the present invention may further include general additives for improving specific functions, such as oxidation stabilizers, UV stabilizers, antistatic agents, and organic/inorganic nucleating agents.

In an embodiment, the polyethylene support may be prepared by injecting the polyethylene resin and the diluent into an extruder, kneading and extruding a mixture to prepare a molten material, passing the molten material through a zone in which an extrusion temperature is lower than liquid-liquid phase separation temperature to carry out liquid-liquid phase separation such that the molten material is prepared in a sheet form, stretching the sheet, and extracting a diluent component from the sheet. A drying process may be further performed after extracting the diluent.

The preparation method of the present invention may further include a step of hydrophilizing the polyethylene support prior to a step of forming the selective layer on the polyethylene support.

Generally, a polyethylene support is hydrophobic, and thus an organic monomer solution can be effectively impregnated into the support through hydrophilization, thereby facilitating the formation of the selective layer to be described below, and improving adhesion with the selective layer.

The hydrophilization may be accomplished using plasma, chemical oxidation, ultraviolet radiation oxidation, atomic layer deposition (ALD), chemical vapor deposition (CVD), inorganic coating or polymer coating treatment, and plasma treatment or chemical oxidation treatment may be performed in the present invention.

The plasma treatment may be performed on the polyethylene support at an intensity of 1 to 100 W, 30 to 70 W, or 40 to 50 W for 1 second to 5 minutes, 1 to 100 seconds, 1 to 60 seconds, 5 to 60 seconds, 5 to 40 seconds, 5 to 30 seconds, 5 to 25 seconds, or 10 to 20 seconds. When the time of the plasma treatment is too short or long, water flux and specific salt flux become low, and thus it is preferably adjusted in the aforementioned range.

Further, a distance between a plasma source and the polyethylene support may be 0.1 to 10 cm during the plasma treatment.

Further, the plasma treatment may be conducted under an air or oxygen atmosphere, and may be conducted at 20 to 30° C. or under a vacuum of 0.15 kPa or less, or 0.10 kPa or less.

Further, the chemical oxidation treatment may be performed at 30 to 70° C., 40 to 60° C., or 50 to 60° C. for 10 to 60 hours, or 12 to 48 hours.

In the present invention, a step of cleaning the polyethylene support may be further included after the hydrophilization. An example of a cleaning solvent may be isopropyl alcohol, water or a mixed solvent thereof.

In the present invention, the polyethylene support may be prepared by forming a selective layer on the polyethylene support.

Such a selective layer may be formed by an interfacial polymerization, dip coating, spray coating, spin coating, or layer-by-layer method, and may be formed by an interfacial polymerization method in the present invention.

In the present invention, since a polyethylene support having a surface with uniform pores due to a wet process is used in the preparation of the selective layer by the interfacial polymerization method, a more stable selective layer can be prepared.

In the present invention, the formation of the selective layer by the interfacial polymerization may be performed by sequentially impregnating or applying a first solution containing a first organic monomer and a second solution containing a second organic monomer on a polyethylene support, and carrying out the interfacial polymerization between the first solution and a second solution.

Here, the first solution includes the first organic monomer and a first solvent that dissolves the first organic monomer, and the second solution includes the second organic monomer and a second solvent that dissolves the second organic monomer.

In an embodiment, the type of the first organic monomer is not particularly limited, for example, one or more selected from the group consisting of m-phenylene diamine (MPD), o-phenylene diamine (OPD), p-phenylene diamine (PPD), piperazine, m-xylenediamine (MXDA), ethylenediamine, trimethylenediamine, hexamethylenediamine, diethylene triamine (DETA), triethylene tetramine (TETA), methane diamine (MDA), isophoroediamine (IPDA), triethanolamine, polyethyleneimine, methyl diethanolamine, hydroxyalkylamines, hydroquinone, resorcinol, catechol, ethylene glycol, glycerine, polyvinyl alcohol, 4,4'-biphenol, methylene diphenyl diisocyanate, m-phenylene diisocyanate, p-phenylene diisocyanate and toluene diisocyanate may be used.

In an embodiment, the type of the first solvent is not particularly limited, for example, one or more selected from the group consisting of water, methanol, ethanol, propanol, butanol, isopropanol, ethyl acetate, acetone, chloroform, tetrahydrofuran, dimethyl sulfoxide, dimethylformamide and N-methyl-2-pyrrolidone may be used.

Furthermore, in the present invention, the first solution may further include a surfactant to improve wettability of the first solution in the polyethylene support.

As such a surfactant, an ionic or nonionic surfactant may be used, and the ionic surfactant may be an anionic, cationic or amphoteric surfactant.

In an embodiment, the anionic surfactant may be one or more selected from the group consisting of ammonium lauryl sulfate, sodium 1-heptanesulfonate, sodium hexanesulfonate, sodium dodecyl sulfate, triethanol ammonium dodecylbenzene sulfate, potassium laurate, triethanolamine stearate, lithium dodecyl sulfate, sodium lauryl sulfate, alkyl polyoxyethylene sulfates, sodium alginate, dioctyl sodium sulfosuccinate, phosphatidyl glycerol, phosphatidylinositol, phosphatidylserine, phosphatidic acid and salts thereof, glyceryl ester, sodium carboxymethyl cellulose, bile acid and salts thereof, cholic acid, deoxycholic acid, glycocholic acid, taurocholic acid, glycodeoxycholic acid, alkyl sulfonates, aryl sulfonates, alkyl phosphates, alkyl phosphonates, stearic acid and salts thereof, calcium stearate, phosphates, carboxymethyl cellulose sodium, dioctylsulfosuccinate, dialkyl esters of sodium sulfosuccinic acid, phospholipids and calcium carboxymethylcellulose.

The cationic surfactant may be one or more selected from the group consisting of a quaternary ammonium compound, benzalkonium chloride, cetyltrimethylammonium bromide, chitosan, lauryldimethylbenzylammonium chloride, acylcarnitine hydrochloride, alkylpyridinium halides, cetylpyridinium chloride, a cationic lipid, polymethyl methacrylate, trimethyl ammonium bromide, a sulfonium compound, polyvinyl pyrrolidone-2-dimethylaminoethyl methacrylate dimethyl sulfate, hexadecyl trimethyl ammonium bromide, a phosphonium compound, benzyl-di(2-chloroethyl) ethylammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethylhydroxyethyl ammonium chloride bromide, $C_{12}$-$C_{15}$ dimethylhydroxyethylammonium chloride, $C_{12}$-$C_{15}$ dimethylhydroxyethylammonium chloride bromide, coconut dimethylhydroxyethylammonium chloride, coconut dimethylhydroxyethylammonium bromide, myristyltrimethylammonium methylsulfate, lauryldimethylbenzylammonium chloride, lauryldimethylbenzylammonium bromide, lauryldimethyl (ethenoxy) 4 ammonium chloride, lauryldimethyl (ethenoxy) 4 ammonium bromide, N-alkyl ($C_{12}$-$C_{18}$) dimethylbenzylammonium chloride, N-alkyl ($C_{14}$-$C_{18}$) dimethylbenzylammonium chloride, N-tetradecyldimethylbenzyl ammonium chloride monohydrate, dimethyldecyl ammonium chloride, N-alkyl ($C_{12}$-$C_{14}$) dimethyl 1-naphthylmethylammonium chloride, trimethylammonium halide alkyl-trimethylammonium salts, dialkyldimethylammonium salts, lauryltrimethylammonium chloride, ethoxylated alkylamidoalkyl dialkylammonium salts, ethoxylated trialkylammonium salts, dialkylbenzene dialkylammonium chlorides, N-didecyldimethylammonium chloride, N-tetradecyldimethylbenzylammonium chloride monohydrate, N-alkyl ($C_{12}$-$C_{14}$) dimethyl 1-naphthylmethylammonium chloride, dodecyldimethylbenzylammonium chloride, dialkylbenzenealkylammonium chloride, lauryltrimethylammonium chloride, alkylbenzylmethylammonium chloride, alkylbenzyldimethylammonium bromide, $C_{12}$ trimethyl ammonium bromide, $C_{15}$ trimethyl ammonium bromide, $C_{17}$ trimethyl ammonium bromide, dodecyl benzyl triethyl ammonium chloride, polydiallyldimethyl ammonium chloride, dimethyl ammonium chloride, alkyldimethylammonium halogenides, tricetylmethylammonium chloride, decyltrimethylammonium bromide, dodecyltriethylammonium bromide, tetradecyltrimethylammonium bromide, methyltrioctylammonium chloride, tetrabutylammonium bromide, benzyltrimethylammonium bromide, choline ester, benzalkonium chloride, stearalkonium chloride, cetylpyridinium bromide, cetylpyridinium chloride, alkylpyridinium salts, amines, amine salts, imidazolinium salts, cationic guar gum, benzalkonium chloride, dodecyltrimethylammonium bromide, triethanolamine and poloxamine. The amphoteric surfactant may be one or more selected from the group consisting of N-dodecyl-N, N-dimethyl-3-ammonio-1-propanesulfonate, betaines, alkyl betaines, alkylamido betaines, amidopropyl betaines, cocoamphocarboxy glycinate, sarcosinate aminopropionate, aminoglycinate, imidazolinium betaines, amphoteric imidazoline, N-alkyl-N, N-dimethylammonio-1-propanesulfonate, 3-chloroamido-1-propyldimethylammonio-1-propanesulfonate, dodecylphosphocholine and sulfo-betaines. Further, the nonionic surfactant may be one or more selected from the group consisting of SPAN 60, polyoxyethylene fatty alcohol ethers, polyoxyethylene sorbitan fatty acid esters, polyoxyethylene fatty acid esters, polyoxyethylene alkyl ethers, polyoxyethylene castor oil derivatives, sorbitan esters, glyceryl esters, glycerol monostearate, polyethylene glycol, polypropylene glycol, polypropylene glycol esters, cetyl alcohol, cetostearyl alcohol, stearyl alcohol, arylalkyl polyether alcohols, polyoxyethylene polyoxypropylene copolymers, poloxamers, polloxamines, methylcellulose, hydroxycellulose, hydroxymethylcellulose, hydroxyethylcellulose, hydroxypropylcellulose, hydroxypropylmethylcellulose, hydroxypropylmethylcellulose phthalate, amorphous cellulose, polysaccharides, starch, starch derivatives, hydroxyethyl starch, polyvinyl alcohol, triethanolamine stearate, amine oxides, dextran, glycerol, acacia gum, cholesterol, tragacanth, and polyvinylpyrrolidone.

In an embodiment, the type of the second organic monomer is not particularly limited, for example, one or more selected from the group consisting of trimesoyl chloride (TMC), terephthaloyl chloride, isophthaloyl chloride, cyclohexane-1,3,5-tricarbonyl chloride, 5-isocyanato-isophthaloyl chloride, cyanuric chloride, trimellitoyl chloride, phosphoryl chloride and glutaraldehyde may be used.

Furthermore, in an embodiment, the type of the second solvent is not particularly limited, for example, one or more selected from the group consisting of n-hexane, pentane, cyclohexane, heptane, octane, carbon tetrachloride, benzene, xylene, toluene, chloroform, tetrahydrofuran and isoparaffin may be used.

In the present invention, the aforementioned first solution includes an amine monomer, and the second solution includes an acyl chloride monomer, and thereby a polyamide selective layer may be synthesized by interfacial polymerization between the monomers.

In an embodiment, a step of removing an excess amount of the first solution on a surface of the support after applying the first solution on the polyethylene support such that the first solution is supported in the support may be further included. Here, removal of the first solution is not particularly limited, and an air gun or a roller is preferably used therefor.

Further, the preparation method according to the present invention may further include a step of cleaning the polyethylene support on which the selective layer is formed.

Further, a forward osmosis device including the aforementioned thin film composite membrane may be provided in the present invention. Moreover, the thin film composite membrane according to the present invention may be used in a pressure-retarded osmosis (PRO) or pressure assisted osmosis (PAO) device.

Further, in the present invention, a forward osmosis method using the aforementioned thin film composite membrane may be provided. The method may include a step of allowing feed water which contains impurities to be purified and a draw solution (osmotic draw solution) to be brought into contact with each other through the thin film composite membrane therebetween, such that water in the feed water passes through the membrane by osmotic pressure into the draw solution with an osmotic concentration higher than that of the feed water. Here, as the draw solution, a draw solution generally used in the forward osmosis process may be used without limitation.

EXAMPLES

Examples 1 to 10

1) Materials
(1) Polyethylene (PE) Support
A polyethylene support prepared by a wet process was used.

The polyethylene support has a thickness of 9 μm, a pore size of 300±10 nm, and a porosity of 54±4%.

In the present invention, FIG. 1 includes images showing a surface and sectional structure of a polyethylene support.

As shown in FIG. 1, it can be seen that the polyethylene support has a pore size of about 300 nm, and has an interconnected pore structure. Furthermore, it can be seen that the surface of the support is composed of uniform pores.
(2) Solvents and Monomers for Interfacial Polymerization
① First Solution
3 wt % of m-phenylene diamine (MPD) as a first organic monomer, water as a first solvent for dissolving the first organic monomer, and 0.1 wt % of sodium dodecyl sulfate (SDS) as a surfactant were used to prepare a first solution.
② Second Solution
0.15 wt % of trimesoyl chloride (TMC) as a second organic monomer and n-hexane as a second solvent for dissolving the second organic monomer were used to prepare a second solution.
2) Preparation Method
(1) Plasma Treatment (Hydrophilization) of Polyethylene Support
The polyethylene support was fixed in a plasma device.

The polyethylene support was surface-treated by adjusting an irradiation intensity and time through plasma treatment in an oxygen atmosphere and a vacuum of 0.09 kPa. Here, the plasma irradiation intensity was adjusted to 40 or 50 W and the irradiation time was adjusted to 5, 10, 20, 30, or 60 seconds to control the degree of hydrophilization (Table 1). Further, a distance between a plasma source and the polyethylene support was 5 cm.

After the surface treatment, the polyethylene support was cleaned with isopropyl alcohol and water.

TABLE 1

|  | Example 1 | Example 2 | Example 3 | Example 4 | Example 5 |
|---|---|---|---|---|---|
| Plasma irradiation intensity (W) | 40 | 40 | 40 | 40 | 40 |
| Plasma irradiation time (seconds) | 5 | 10 | 20 | 30 | 60 |

|  | Example 6 | Example 7 | Example 8 | Example 9 | Example 10 |
|---|---|---|---|---|---|
| Plasma irradiation intensity (W) | 50 | 50 | 50 | 50 | 50 |

TABLE 1-continued

| Plasma irradiation time (seconds) | 5 | 10 | 20 | 30 | 60 |
|---|---|---|---|---|---|

(2) Interfacial Polymerization (Preparation of Thin Film Composite Membrane (PE-TFC))

The polyethylene support which was plasma-treated in the above (1) was fixed in a reaction frame, and 10 g of the first solution was poured onto the polyethylene support to be supported in the support.

After an excess of the first solution on the support surface was removed using a roller, 6 g of the second solution was poured thereonto to synthesize a selective layer through interfacial polymerization between the monomers at the interface.

Unreacted organic monomers were cleaned with n-hexane, dried and stored in water.

In the present invention, FIG. 2 is an image showing a surface structure of a thin film composite membrane prepared in Example 7.

Examples 11 to 13

A thin film composite membrane was prepared in the same manner as in Examples 1 to 10 except that the chemical oxidation treatment was performed for hydrophilization.

The hydrophilization was carried out at the temperature and time shown in the following Table 2 after impregnating the polyethylene support in a 9 to 11% sodium hypochlorite solution.

TABLE 2

|  | Example 11 | Example 12 | Example 13 |
|---|---|---|---|
| Hydrophilization temperature (° C.) | 50 | 50 | 50 |
| Hydrophilization time (hours) | 12 | 24 | 48 |

Examples 14 to 17

A thin film composite membrane was prepared in the same manner as in Examples 1 to 10 except that the plasma treatment was performed for hydrophilization, or hydrophilization was not performed.

TABLE 3

|  | Example 14 | Example 15 | Example 16 | Example 17 |
|---|---|---|---|---|
| Plasma irradiation intensity (W) | 10 | 50 | 90 | — |
| Plasma irradiation time (seconds) | 10 | 10 | 10 | — |

Examples 18 to 20

A thin film composite membrane was prepared in the same manner as in Examples 1 to 10 except that wet processed polyethylene manufactured by W-SCOPE Corporation was used as a polyethylene support and hydrophilization (plasma treatment) was performed under conditions of the following Table 5.

Here, the polyethylene has the physical properties shown in the following Table 4

TABLE 4

|  | Thickness (μm) | Pore size (nm) | Porosity (%) |
|---|---|---|---|
| Example 18 | 9 | 300 ± 15 | 54 ± 2 |
| Example 19 | 10 | 800 ± 7 | 82 ± 2 |
| Example 20 | 20 | 1000 ± 10 | 77 ± 6 |

TABLE 5

|  | Example 18 | Example 19 | Example 20 |
|---|---|---|---|
| Plasma irradiation intensity (W) | 50 | 50 | 50 |
| Plasma irradiation time (seconds) | 10 | 10 | 10 |

Comparative Example 1

A single CTA membrane commercially available from HTI was used as the thin film composite membrane.

Comparative Example 2

A TFC thin film composite membrane commercially available from HTI was used as the thin film composite membrane.

Comparative Example 3

A polypropylene support (biaxial stretching (secondary)) from SKC was used as a support. The support is a support prepared by a dry process.

The polypropylene support was subjected to hydrophilization and interfacial polymerization in the same manner as in Example 7, except that the polypropylene support was subjected to plasma treatment at 50 W for 10 seconds.

The support used has a thickness of 20 μm, a pore size of 530±20 nm, and a porosity of 56±3%.

Experimental Example 1. Performance Test

1. Performance Comparison of Thin Film Composite Membranes Through Forward Osmosis Process
A. Conditions A performance comparison (water flux, reverse salt flux and specific salt flux) of the thin film composite membranes according to the examples and comparative examples in the forward osmosis process was conducted.

Specifically, the water flux, reverse salt flux, and specific salt flux of the thin film composite membranes were compared by using a 1 M NaCl draw solution under the process conditions of a flow rate of 0.6 $Lmin^{-1}$ and a temperature of 25±0.5° C.

A. Results

The performance evaluation results of the membrane are shown in the following Tables 6 and 7.

TABLE 6

| | Irradiation intensity (W) | Irradiation time (seconds) | Water flux ($J_w$, $Lm^{-2}h^{-1}$) | Reverse salt flux ($J_s$, $gm^{-2}h^{-1}$) | Specific salt flux ($J_w/J_s$, $Lg^{-1}$) |
|---|---|---|---|---|---|
| Example 1 | 40 | 5 | 34.57 | 9.42 | 3.66 |
| Example 2 | 40 | 10 | 42.71 | 14.59 | 2.92 |
| Example 3 | 40 | 20 | 36.18 | 9.78 | 3.69 |
| Example 4 | 40 | 30 | 30.91 | 12.41 | 2.49 |
| Example 5 | 40 | 60 | 30.72 | 22.05 | 1.39 |
| Example 6 | 50 | 5 | 43.36 | 15.89 | 2.72 |
| Example 7 | 50 | 10 | 46.88 | 11.25 | 4.16 |
| Example 8 | 50 | 20 | 41.23 | 14.69 | 2.80 |
| Example 9 | 50 | 30 | 42.15 | 22.30 | 1.89 |
| Example 10 | 50 | 60 | 40.79 | 37.40 | 1.09 |
| Example 18 | 50 | 10 | 42.36 | 14.07 | 3.01 |
| Example 19 | 50 | 10 | 33.86 | 13.27 | 2.55 |
| Example 20 | 50 | 10 | 24.32 | 21.52 | 1.13 |
| Comparative Example 1 | | | 11.29 | 9.03 | 1.25 |
| Comparative Example 2 | | | 14.57 | 13.48 | 1.08 |
| Comparative Example 3 | 50 | 10 | 15.78 | 29.41 | 0.54 |

TABLE 7

| | Temperature (° C.) | Treatment time (hours) | Water flux ($J_w$, $Lm^{-2}h^{-1}$) | Reverse salt flux ($J_s$, $gm^{-2}h^{-1}$) | Specific salt flux ($J_w/J_s$, $Lg^{-1}$) |
|---|---|---|---|---|---|
| Example 11 | 50 | 12 | 35.89 | 20.63 | 1.74 |
| Example 12 | 50 | 24 | 40.23 | 14.59 | 2.75 |
| Example 13 | 50 | 48 | 42.89 | 14.39 | 2.93 |

As shown in Tables 6 and 7, the thin film composite membranes prepared in the examples showed performance differences depending on the surface treatment (plasma treatment or chemical oxidation treatment) of the polyethylene support.

The highest $J_w$ (46.88 $Lm^{-2}h^{-1}$) and the highest $J_w/J_s$ (4.16 $Lg^{-1}$) were observed when the plasma was irradiated at 50 W for 10 seconds (Example 7). When the plasma irradiation intensity was lowered from 50 W to 40 W, the $J_w$ generally decreased, but the $J_w/J_s$ tended to increase. Further, as the plasma irradiation time was prolonged, the highest $J_w$ and $J_w/J_s$ were shown at 10 seconds, but $J_w$ and $J_w/J_s$ both tended to decrease after 10 seconds.

When comparing Example 18 with Example 19, the $J_w/J_s$ tended to be partially lowered due to the difference in porosity of the polyethylene support, but the membrane still had a higher $J_w/J_s$ compared to the comparative examples. In the case of Example 20, the polyethylene support had a thickness of 20 μm and a large pore size, and thus the $J_w/J_s$ was lower compared to Example 18, but the membrane had excellent $J_w$, $J_s$ and $J_w/J_s$ compared with the comparative examples. That is, it can be confirmed from Examples 18 to 20 that $J_w$ and $J_w/J_s$ are affected by the thickness and porosity of the polyethylene support, but the thickness and porosity of the support according to the present invention is sufficient to provide a membrane that can be used as a forward osmosis membrane.

When comparing the performance of the single CTA membrane from HTI, which is a commercial forward osmosis membrane, with that of the thin film composite membrane having the same structure, the thin film composite membrane prepared through the present invention exhibited a higher $J_w$ and $J_w/J_s$ of about three times or more.

Furthermore, in the case of Comparative Example 3 in which the polypropylene support prepared by a dry process was used, since the polypropylene support was prepared by a dry process, the surface pore size was nonuniform, and thus an unstable selective layer was prepared, and the membrane exhibited low $J_w$ and $J_w/J_s$.

It can be seen from these results that the polyethylene support-based thin film composite membrane according to the present invention exhibits very excellent permeation performance, and is not only cost competitive, but also has a selective layer prepared using an interfacial polymerization method that has already been commercialized, and thus can be fully commercialized. Further, it is expected that the support will be applicable to various severe water quality conditions because of its excellent mechanical strength and, thermal and chemical durability.

Furthermore, in the present invention, FIG. 3 is a graph showing a result of comparing the $J_w$ and $J_w/J_s$ of thin film composite membranes prepared in the examples and comparative examples. As shown in FIG. 3, the membrane according to the present invention has superior $J_w/J_s$ and $J_w$ as compared with the commercial membranes, has high performance and high durability, and can be easily used as a forward osmosis membrane.

2) Performance Comparison of Thin Film Composite Membrane by Pressurization Process (1) Conditions A performance comparison (water permeability coefficient, salt permeability coefficient, intrinsic selectivity and structural parameter (S)) of the thin film composite membranes according to Examples 1 to 10 and 18 to 20 were conducted.

Specifically, the water permeability coefficient, salt permeability coefficient, intrinsic selectivity and structural parameter of the thin film composite membrane obtained using 200 ppm of a NaCl solution under the process conditions of a pressure of 5 bar, a flow rate of 1.0 $Lmin^{-1}$ and a temperature of 25±0.5° C. were compared.

(2) Results

The results of the performance evaluation of the membrane are shown in the following Table 8.

TABLE 8

| | Irradiation intensity (W) | Irradiation time (hours) | Water permeability coefficient (A, $Lm^{-2}h^{-1}bar^{-1}$) | Salt permeability coefficient (B, $Lm^{-2}h^{-1}$) | Intrinsic selectivity (B/A, kPa) | Structural parameter (S, μm) |
|---|---|---|---|---|---|---|
| Example 1 | 40 | 5 | 1.98 | 0.37 | 18.7 | 160 |
| Example 2 | 40 | 10 | 2.68 | 0.46 | 17.2 | 141 |
| Example 3 | 40 | 20 | 2.06 | 0.40 | 19.4 | 152 |

TABLE 8-continued

| | Irradiation intensity (W) | Irradiation time (hours) | Water permeability coefficient (A, $Lm^{-2}h^{-1}bar^{-1}$) | Salt permeability coefficient (B, $Lm^{-2}h^{-1}$) | Intrinsic selectivity (B/A, kPa) | Structural parameter (S, μm) |
|---|---|---|---|---|---|---|
| Example 4 | 40 | 30 | 1.53 | 0.28 | 18.3 | 154 |
| Example 5 | 40 | 60 | 1.60 | 0.30 | 18.8 | 163 |
| Example 6 | 50 | 5 | 3.07 | 0.54 | 17.6 | 153 |
| Example 7 | 50 | 10 | 3.12 | 0.48 | 15.4 | 135 |
| Example 8 | 50 | 20 | 2.54 | 0.40 | 15.7 | 143 |
| Example 9 | 50 | 30 | 2.53 | 0.45 | 17.8 | 137 |
| Example 10 | 50 | 60 | 2.64 | 0.49 | 18.6 | 151 |
| Example 18 | 50 | 10 | 2.70 | 0.48 | 17.7 | 144 |
| Example 19 | 50 | 10 | 1.87 | 0.34 | 18.1 | 157 |
| Example 20 | 50 | 10 | 1.50 | 0.31 | 20.6 | 243 |

When comparing the performance results obtained through the forward osmosis process, the $J_w$ and $J_w/J_s$ of Example 7, which had the best performance in the forward osmosis process of Experimental Example 7, showed excellent results (high A and B/A).

Furthermore, the structural parameters indicating the specific properties of the support were calculated as 130 to 250 μm, thereby confirming that the membrane according to the present invention can be easily used as a forward osmosis membrane.

2) Water Contact Angle and Surface Free Energy (1) Conditions

The water contact angle and surface free energy of the thin film composite membranes according to the examples were compared.

Specifically, a contact angle was measured using water, glycerol, diiodomethane, and a surface free energy was calculated by the Young-Dupre equation using the contact angle.

(2) Results

In the present invention, FIG. 4 and Table 9 respectively include photographs and a table showing the water contact angle of the polyethylene support that is surface-treated according to Examples 1 to 13.

TABLE 9

| | Example 1 | Example 2 | Example 3 | Example 4 | Example 5 | Example 6 | Example 7 |
|---|---|---|---|---|---|---|---|
| Water contact angle (degrees) | 98 | 96 | 94 | 76 | 65 | 98 | 91 |

| | Example 8 | Example 9 | Example 10 | Example 11 | Example 12 | Example 13 |
|---|---|---|---|---|---|---|
| Water contact angle (degrees) | 87 | 72 | 62 | 97 | 95 | 94 |

It can be seen from FIG. 4 and Table 9 that, in the case of a plasma treatment, as an irradiation intensity and irradiation time increase, the hydrophilic property of the support surface increases and a water contact angle becomes lower, and also in the case of a chemical oxidation treatment, a water contact angle is lowered as the and irradiation time increases.

Further, the following Table 10 is a table showing the water contact angle and surface free energy of the polyethylene support that is surface-treated according to Examples 14 to 17.

TABLE 10

| | Water contact angle (degrees) | | | Surface free energy |
|---|---|---|---|---|
| | Water | Glycerol | Diiodomethane | ($mJm^{-2}$) |
| Example 14 | 103 | 82 | 29 | 44.7 |
| Example 15 | 90 | 74 | 27 | 45.4 |
| Example 16 | 62 | 60 | 28 | 45.1 |
| Example 17 | 118 | 110 | 42 | 38.8 |

It can be seen from Table 10 that, as the plasma irradiation intensity increases, wettability increases and a water contact angle decreases. Further, it can be confirmed that, as wettability increases, the surface tension of the liquid decreases, and the surface energy of the solid (polyethylene support) increases.

Experimental Example 2. Mechanical Strength Test (1) Conditions

The mechanical tensile strength of the thin film composite membranes according to the examples and comparative examples were compared.

In the mechanical strength test, a specimen with a width of 1 cm was mounted on tensile test equipment (H5KT, Tinius Olsen) and stress according to the strain rate of the specimen was measured while the specimen is stretched at a speed of 20 $mmmin^{-1}$.

(3) Results

The results of evaluating the mechanical strength of the membrane are shown in FIG. 5.

As shown in FIG. 5, it can be confirmed that the thin film composite membrane prepared in an example has superior mechanical tensile properties as compared to the membrane of comparative examples in use.

A polyethylene support according to the present invention, particularly, a polyethylene support prepared by a wet process has excellent mechanical strength, high porosity and pore connectivity, and outstanding durability and chemical resistance. Accordingly, when the polyethylene support is used as a thin film composite membrane, high performance and high durability can be imparted to the membrane. Such a membrane can be used as a forward osmosis, pressure-retarded osmosis (PRO) and pressure assisted osmosis (PAO) membrane.

Furthermore, the polyethylene support can maximize price competitiveness in the membrane market due to being cheaper than a commercial support used in the manufacture of existing membranes.

What is claimed is:

1. A thin film composite membrane for forward osmosis, comprising:
a polyethylene support; and
a selective layer formed on the polyethylene support,
wherein the thin film composite membrane has a structural parameter (S) of 1000 µm or less calculated by the following Equation 1,
wherein the polyethylene support has a thickness of 1 to 20 µm:

$$S = \frac{D}{J_w} \ln\left(\frac{B + A\pi_{D,b}}{B + J_w + A\pi_{F,m}}\right)$$

wherein $J_w$ is water flux, A is a water permeability coefficient, B is a salt permeability coefficient, D is a sodium chloride (NaCl) diffusion coefficient of $1.48 \times 10^{-9}$ m$^2$s$^{-1}$, $\pi_{D,b}$ is an osmotic pressure of a draw solution, and $\pi_{F,m}$ is an osmotic pressure of a feed solution.

2. The thin film composite membrane for forward osmosis according to claim 1, wherein the polyethylene support comprises a resin comprising polyethylene and one or more polymers selected from the group consisting of polypropylene, polymethylpentene, and polybutene-1.

3. The thin film composite membrane for forward osmosis according to claim 1, wherein the polyethylene support has a water contact angle of 120 degrees or less, and a surface free energy of 30 mJm–2 or more.

4. The thin film composite membrane for forward osmosis according to claim 1, wherein the polyethylene support is hydrophilized.

5. The thin film composite membrane for forward osmosis according to claim 1, wherein the selective layer comprises a crosslinked or uncrosslinked polyamide, polypiperazineamide, polyester, polyurethane, polyvinyl alcohol, polyimide or polyetherimide, or a fully aromatic compound, a partially aromatic compound or a fully aliphatic compound.

6. The thin film composite membrane for forward osmosis according to claim 1, wherein the thin film composite membrane has a water permeability coefficient (A) of 1.0 Lm–2h–1bar–1 or more, a salt permeability coefficient (B) of 10.0 Lm–2h–1 or less, and an intrinsic selectivity (B|A) of 300 kPa or less when 200 ppm of a NaCl solution is used under conditions including a pressure of 5 bar, a flow rate of 1.0 Lmin–1 and a temperature of 25±0.5° C.

7. The thin film composite membrane for forward osmosis according to claim 1, wherein the thin film composite membrane has a water flux (Jw) of 20 Lm–2h–1 or more, a reverse salt flux (Js) of 100 µm–2h–1 or less, and a specific salt flux (Jw/Js) of 0.2 Lg–1 or more when 1 M NaCl solution is used under a forward osmosis condition at a flow rate of 0.6 Lmin–1 and a temperature of 25±0.5° C.

8. The thin film composite membrane for forward osmosis according to claim 1, wherein the forward osmosis comprises general forward osmosis, pressure-retarded osmosis (PRO) or pressure assisted osmosis (PAO).

9. A method of preparing the thin film composite membrane for forward osmosis according to claim 1, comprising forming a selective layer on a polyethylene support.

10. The method according to claim 9, wherein the polyethylene support is prepared by melt-extrusion of a polyethylene resin and a diluent followed by stretching.

11. The method according to claim 10, wherein, in addition to the polyethylene resin and the diluent, polypropylene, polymethylpentene, polybutene-1 or a mixed resin thereof is further used in the melt-extrusion.

12. The method according to claim 9, further comprising hydrophilizing the polyethylene support prior to forming the selective layer on the polyethylene support.

13. The method according to claim 12, wherein the hydrophilizing is accomplished using plasma, chemical oxidation, ultraviolet radiation oxidation, atomic layer deposition (ALD), chemical vapor deposition (CVD), inorganic coating or polymer coating treatment.

14. The method according to claim 13, wherein the plasma treatment is performed on the polyethylene support at 1 to 100 W for 1 second to 5 minutes, and a distance between a plasma source and the polyethylene support is 0.1 to 10 cm during the plasma treatment.

15. The method according to claim 13, wherein the plasma treatment is performed at 20 to 30° C. or 0.15 kPa or less, using a batch method or continuous method.

16. The method according to claim 9, wherein the selective layer is formed by an interfacial polymerization, dip coating, spray coating, spin coating, or layer-by-layer method.

17. The method according to claim 9, wherein the selective layer is formed by sequential impregnation or application of a first solution containing a first organic monomer and a second solution containing a second organic monomer on the polyethylene support, followed by interfacial polymerization between the first solution and the second solution.

18. The method according to claim 17, wherein the first solvent further includes an ionic or nonionic surfactant.

19. A forward osmosis device, comprising the thin film composite membrane according to claim 1.

20. The thin film composite membrane of claim 1, wherein the polyethylene support comprises a resin consisting essentially of polyethylene.

21. The thin film composite membrane of claim 1, wherein the polyethylene support displays uniform pore size.

22. The thin film composite membrane of claim 1, wherein the polyethylene is uniformly distributed in the polyethylene support.

23. The thin film composite membrane of claim 22, wherein the polyethylene support is in contact with the selective layer.

* * * * *